(12) United States Patent
Wada

(10) Patent No.: US 7,904,919 B2
(45) Date of Patent: Mar. 8, 2011

(54) DISK APPARATUS

(75) Inventor: Shinichi Wada, Ehime (JP)

(73) Assignee: Panasonic Corporation, Osaka (JP)

( * ) Notice: Subject to any disclaimer, the term of this patent is extended or adjusted under 35 U.S.C. 154(b) by 889 days.

(21) Appl. No.: 11/578,049

(22) PCT Filed: Oct. 5, 2004

(86) PCT No.: PCT/JP2004/014994
§ 371 (c)(1),
(2), (4) Date: Jul. 31, 2007

(87) PCT Pub. No.: WO2005/101399
PCT Pub. Date: Oct. 27, 2005

(65) Prior Publication Data
US 2007/0297297 A1    Dec. 27, 2007

(30) Foreign Application Priority Data
Apr. 14, 2004   (JP) .................................. 2004-118849

(51) Int. Cl.
*G11B 17/051* (2006.01)
(52) U.S. Cl. ......................... 720/621; 720/623
(58) Field of Classification Search .................. 720/617, 720/619–626, 627–629, 630–633, 638, 641–645; G11B 17/04, 17/05, 17/051
See application file for complete search history.

(56) References Cited

U.S. PATENT DOCUMENTS

| 5,650,990 A | * | 7/1997 | Choi | 720/641 |
| 2003/0174627 A1 | * | 9/2003 | Suzuki | 369/77.1 |

FOREIGN PATENT DOCUMENTS

| JP | 07-220353 | 8/1995 |
| JP | 2002-352498 | 12/2002 |
| JP | 2002-367261 | 12/2002 |

OTHER PUBLICATIONS

Chinese Office Action dated Nov. 16, 2007 with English translation thereof.

* cited by examiner

*Primary Examiner* — Thang V Tran
*Assistant Examiner* — Nathan A Danielson
(74) *Attorney, Agent, or Firm* — Dickinson Wright PLLC

(57) ABSTRACT

A disk apparatus comprising a chassis outer sheath having a base body 10 and a lid, in which a front surface of the chassis outer sheath is formed with a disk inserting opening 11 into which a disk is directly inserted, a lever which is operated when the disk is inserted or discharged is provided in the chassis outer sheath, the lever is provided at its movable side end with a guide 17, and the disk is guided by the guide 17, wherein
the guide 17 comprises a stationary portion 101B fixed to the lever, a movable portion 101C which is displaced with respect to the stationary portion 101B, and an elastic body which biases the movable portion 101C in a direction away from the stationary portion 101B.

13 Claims, 12 Drawing Sheets

DISK APPARATUS

TECHNICAL FIELD

The present invention relates to a disk apparatus for recording or replaying into or from a disk-like recording medium such as a CD and a DVD, and more particularly, to a so-called slot-in type disk apparatus capable of directly inserting or discharging a disk from or to outside.

BACKGROUND TECHNIQUE

A loading method is widely employed in conventional disk apparatuses. In this method, a disk is placed on a tray or a turntable, and the tray or the turntable is loaded into an apparatus body.

According to such a loading method, however, since the tray or the turntable is required, there is a limit for thinning the disk apparatus body.

As a slot-in type disk apparatus, there is proposed a method in which a conveying roller is abutted against a disk surface to pull the disk in (e.g., a patent document 1).

According to the slot-in type as proposed in the patent document 1, however, since a conveying roller which is longer than a diameter of the disk is used, the width of the apparatus must be increased, and the thickness of the apparatus is also increased due to this conveying roller.

For this reason, the slot-in type disk apparatus which transfers a disk by the lever is suitable for reducing a disk apparatus in thickness and size (e.g., a patent document 2).
[Patent document 1]
Japanese Patent Application Laid-open No. H7-220353
[Patent document 2]
Japanese Patent Application Laid-open No. 2002-352498

According to an apparatus of an invention of the patent document 2, however, it is necessary to provide, between a roller provided on a lever and an inner surface of a lid, a slight gap for smoothly turning the lever.

In recent years, disks each having a tapered outer peripheral end surface have appeared on the market. If such a disk is used in the apparatus of the patent document 2, the disk is engaged in between the roller and the inner surface of the lid, and there is a fear that the operation of the lever is hindered.

Hence, it is an object of the present invention to provide a disk apparatus in which a lever can reliably be operated even if a disk having a tapered outer peripheral end surface is used.

It is another object of the invention to provide a disk apparatus having no gap between a roller and an inner surface of a lid.

DISCLOSURE OF THE INVENTION

A first aspect of the invention provides a disk apparatus comprising a chassis outer sheath having a base body and a lid, in which a front surface of the chassis outer sheath is formed with a disk inserting opening into which a disk is directly inserted, a lever which is operated when the disk is inserted or discharged is provided in the chassis outer sheath, the lever is provided at its movable side end with a guide, and the disk is guided by the guide, wherein the guide comprises a stationary portion fixed to the lever, a movable portion which is displaced with respect to the stationary portion, and an elastic body which biases the movable portion in a direction away from the stationary portion.

According to this aspect, the movable portion is projected in a direction where the movable portion separates from the stationary portion by the elastic body. Thus, it is possible to reliably hold a disk to be inserted by the movable portion.

According to a second aspect of the invention, in the disk apparatus of the first aspect, the movable portion abuts against an inner side surface of the lid by the elastic body.

According to this aspect, since a gap is not generated between the movable portion and the lid even when there is an error in designed size or the lever is bent, a disk can reliably be guided by the movable portion.

According to a third aspect of the invention, in the disk apparatus of the second aspect, a rib is provided on an end surface of the movable portion on the side of the lid.

According to this aspect, the movable portion comes into contact with the lid by the rib. Thus, the sliding friction is reduced, and the lever can smoothly move.

According to a fourth aspect of the invention, in the disk apparatus of the third aspect, the rib is of a ring-like shape.

According to this aspect, as compared with a case where the rib is partially provided, it becomes more difficult to incline the roller. Thus, a disk can reliably be guided by the movable portion. The movable portion itself can smoothly rotate and the disk can smoothly be transferred.

According to a fifth aspect of the invention, in the disk apparatus of the first aspect, an outer diameter of the stationary portion on the side of the lever is set greater than an outer diameter of the stationary portion on the side of the movable portion, and an outer peripheral surface of the stationary portion is inclined.

According to this aspect, a disk which is inserted is allowed to slip toward the movable portion by the inclined surface of the stationary portion. Thus, it is possible to introduce a disk to a predetermined position.

According to a sixth aspect of the invention, in the disk apparatus of the first aspect, an outer diameter of the movable portion is set smaller than an outer diameter of the stationary portion.

According to this aspect, the disk can be guided to the movable portion.

According to a seventh aspect of the invention, in the disk apparatus of the first aspect, an outer diameter of the movable portion on the side of the lid is set greater than an outer diameter of the movable portion on the side of the lever, and an outer peripheral surface of the movable portion on the side of the lid is inclined.

According to this aspect, it is possible to suppress the inclination of the disk.

According to an eighth aspect of the invention, in the disk apparatus of the first aspect, a conical coil spring is used as the elastic body, an outer diameter of the conical coil spring on the side of the lever is set greater than an outer diameter of the conical coil spring on the side of the movable portion.

According to this aspect, as compared with a concentric coil spring, displacement when it is compressed in a direction perpendicular to an axis of the coil spring can be increased. That is, the vertical stroke amount of the movable portion can be increased. Therefore, a distance between the lever and the movable roller can be reduced.

According to a ninth aspect of the invention, in the disk apparatus of the first aspect, a stationary side end which serves as a turning fulcrum of the lever is disposed on an outer periphery on the side of a side surface or a rear surface of the base body, and the movable side end moves on an inner periphery of the base body.

According to this aspect, even a lever which is fixed by an outer periphery of the base body and which is supported in a cantilever manner is bent, the guide located on the inner periphery of the base body can reliably hold a disk to be inserted.

A tenth aspect of the invention provides a disk apparatus in which a lever is operated when a disk is inserted or discharged, the lever is provided at its movable side end with a guide, and the disk is guided by the guide, wherein the guide comprises a stationary portion fixed to the lever, a movable portion which is displaced with respect to the stationary portion, and an elastic body which biases the movable portion in a direction away from the stationary portion, a stationary side end which serves as a turning fulcrum of the lever is disposed on an outer periphery on the side of a side surface or a rear surface of the base body, the movable side end moves on an inner periphery of the base body, and the movable portion abuts against an inner side surface of the lid by the elastic body.

According to this aspect, since the guide located on the inner periphery of the base body has no gap between the movable portion and the lid even when there is an error in designed size or the lever is bent, and a disk to be inserted can reliably be guided by the movable portion.

According to an eleventh aspect of the invention, in the disk apparatus of the tenth aspect, a ring-like rib is provided on an end surface of the movable portion on the side of the lid.

According to this aspect, the movable portion comes into contact with the lid by the rib. Thus, the sliding friction is reduced, and the lever can smoothly move. The movable portion itself can smoothly rotate, and the disk can be transferred smoothly.

According to a twelfth of the invention, in the disk apparatus of the first to eleventh aspects, an inner side surface of the lid is coated with fluorine in which urethane resin beads are mixed.

According to this aspect, the movable portion can smoothly slide due to the sliding performance obtained by the characteristics of the fluorine, and it is possible to prevent a disk from being damaged due to characteristics of urethane resin. A disk can smoothly slide by sliding performance obtained by the characteristics of the fluorine. It is possible to effectively prevent a disk to be inserted from inclining.

BEST MODE FOR CARRYING OUT THE INVENTION

A disk apparatus according to an embodiment of the present invention will be explained.

Figure 1:
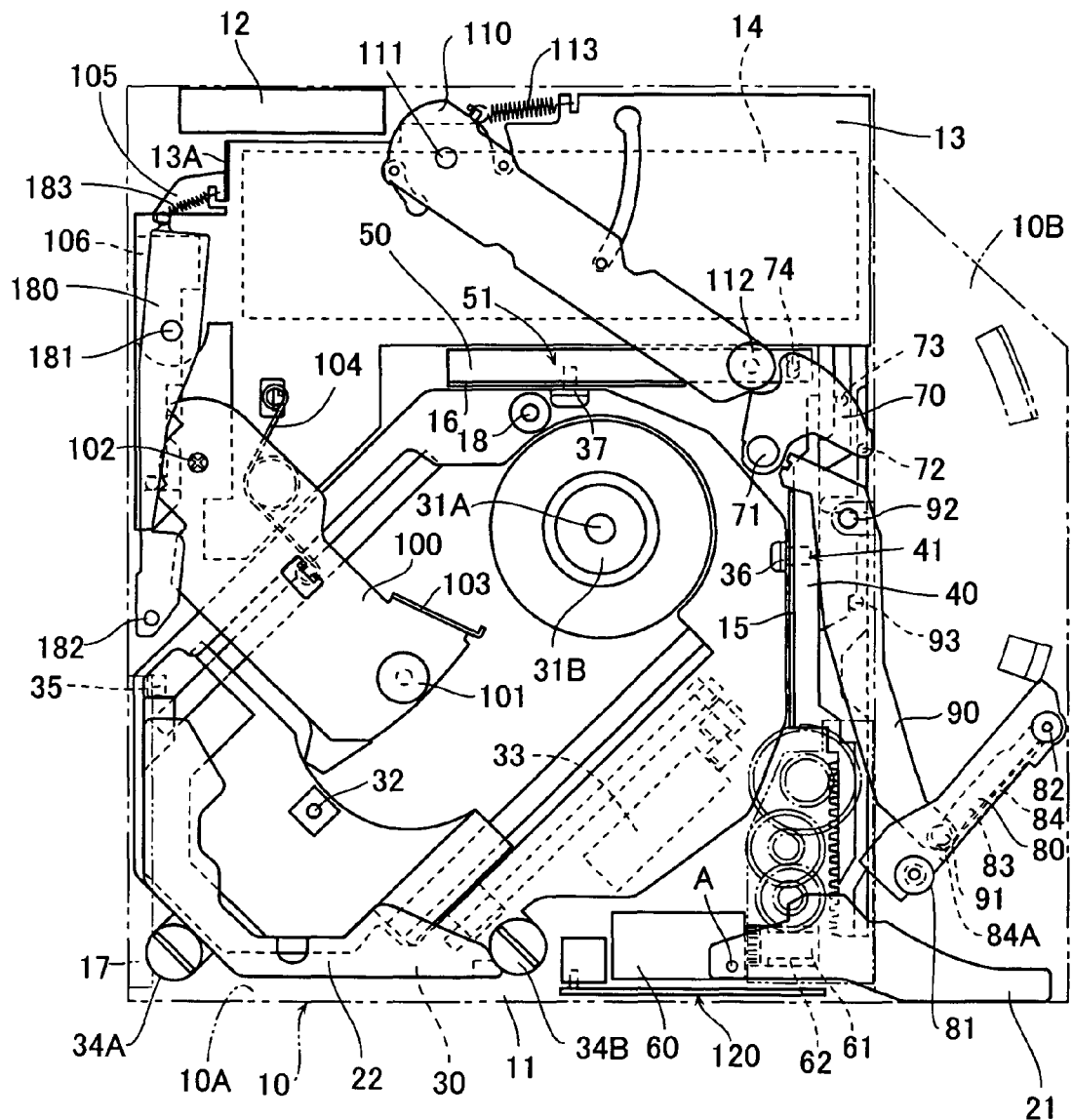
FIG. 1 is a plan view of a base body of a disk apparatus according to an embodiment of the present invention.
Figure 2:
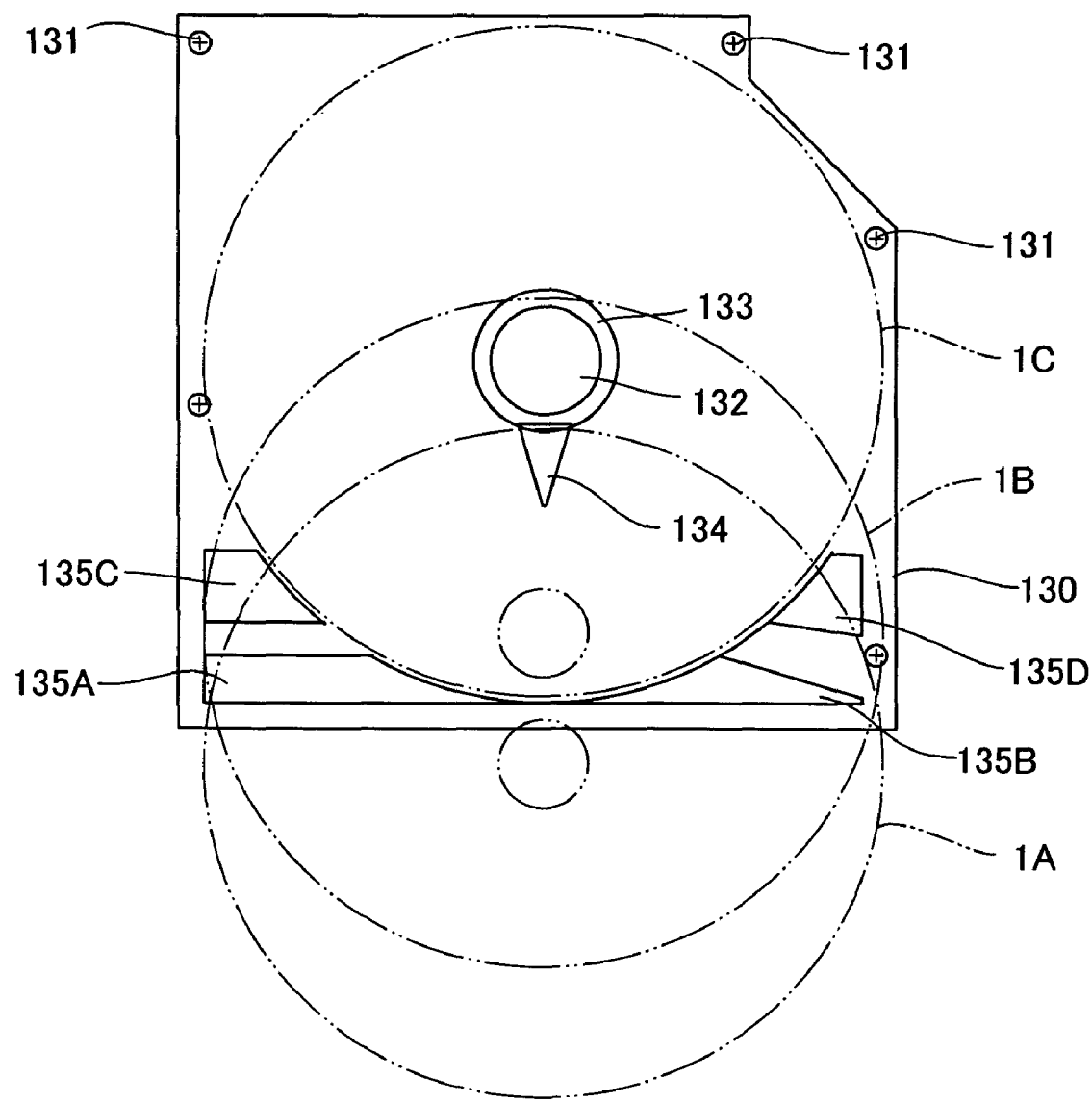
FIG. 2 is a plan view of a lid of the disk apparatus.
Figure 3:
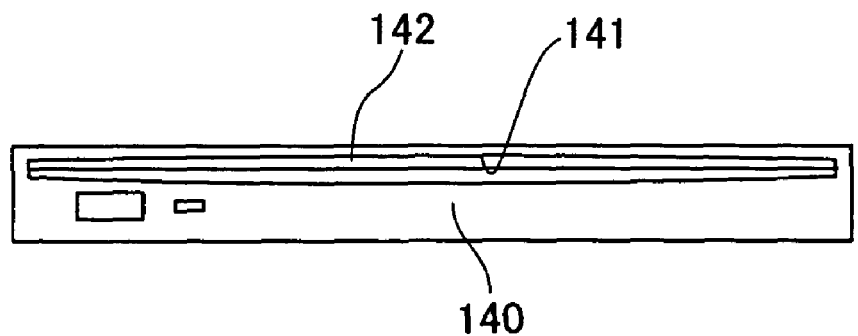
FIG. 3 is a front view of a bezel mounted on a front surface of a chassis outer sheath of the disk apparatus.
Figure 4:
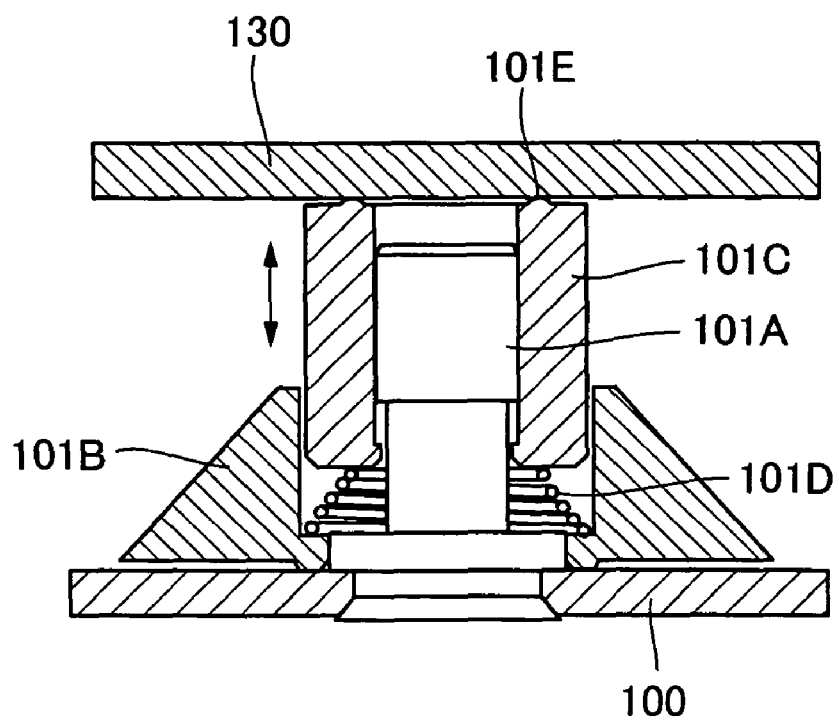
FIG. 4 is an enlarged sectional view of an essential portion of a guide of a discharge lever of the disk apparatus.

FIG. 1 is a plan view of a base body of a disk apparatus according to an embodiment of the present invention. FIG. 2 is a plan view of a lid of the disk apparatus. FIG. 3 is a front view of a bezel mounted on a front surface of a chassis outer sheath of the disk apparatus. FIG. 4 is an enlarged sectional view of an essential portion of a guide of a discharge lever of the disk apparatus.

The disk apparatus of the embodiment comprises a chassis outer sheath having a base body and a lid. A bezel is mounted on a front surface of the chassis outer sheath. The disk apparatus of the embodiment is of a slot-in type in which a disk is directly inserted into the disk apparatus from a disk inserting opening formed in the bezel shown in FIG. 3.

As shown in FIG. 1, various parts having function for recording or replaying into or from a disk, and a function for loading the disk are mounted on the base body 10.

The base body 10 is formed with a deep portion 10A and a shallow portion 10B with respect to the lid. A wing portion extending from a front surface to a rear surface is formed by the shallow portion 10B.

A disk inserting opening 11 into which a disk is directly inserted is formed in a front surface of the base body 10. A connector 12 is disposed on an end of a rear surface of the base body 10. A traverse 30 is disposed on the base body 10 on the side of the disk inserting opening 11, and a rear base 13 is disposed on the base body 10 on the side of the connector 12. The traverse 30 and the rear base 13 are not superposed on each other. A printed substrate 14 is disposed on the rear base 13 on the side of the surface of the base body 10.

The traverse 30 holds a spindle motor 31A, a pickup 32, and drive means 33 which moves the pickup 32. A rotation shaft of the spindle motor 31A includes a hub 31B which holes a disk. The spindle motor 31A is provided on one end side of the traverse 30, and the pickup 32 is provided such that the pickup 32 can move from the one end side to the other end side of the traverse 30. When the pickup 32 is stopped, it is disposed on the other end side of the traverse 30.

The drive means 33 includes a drive motor, a pair of rails on which the pickup 32 slides, and a gear mechanism for transmitting a driving power of the drive motor to the pickup 32.

The pair of rails are disposed on both sides so that the one end side and the other end side of the traverse 30 are connected to each other. The drive motor is disposed outside of the rail on the side of the disk inserting opening 11 such that a drive shaft and the rails are in parallel to each other. The gear mechanism is disposed in a space between the drive motor and the rail on the side of the disk inserting opening 11.

The spindle motor 31A of the traverse 30 is located at a central portion of the base body 10, a reciprocating range of the pickup 32 is located closer to the disk inserting opening 11 than the spindle motor 31A, and a reciprocating direction of the pickup 32 is different from an inserting direction of the disk. An angle formed between the reciprocating direction of the pickup 32 and the inserting direction is in a range of 40° to 45°.

The traverse 30 is supported by the base body 10 by means of insulators 34A and 34B.

It is preferable that the insulators 34A and 34B are disposed close to a stationary position of the pickup 32 than the position of the spindle motor 31A, and are disposed closer to the disk inserting opening 11 than the stationary position of the pickup 32. In this embodiment, the insulator 34A is provided on one end side of the disk inserting opening 11 near its inner side, and the insulator 34B is provided on the central portion of the disk inserting opening 11 near the inner side thereof. The insulators 34A and 34B include damper mechanisms made of elastic material. The insulators 34A and 34B can be displaced by the damper mechanism in a direction in which the traverse 30 is separated from the base body 10.

A rib 35 is provided on a surface of the traverse 30 on the side of the base body 10. The rib 35 is provided on the side of the stationary position of the pickup 32 outside of the rail opposite from the disk inserting opening 11. The rib 35 has such an enough height that when the traverse 30 approaches the base body 10, the traverse 30 abuts against the base body 10, the traverse 30 can be displaced in a direction where the traverse 30 is separated from the base body 10 at the positions of the insulators 34A and 34B. Although the rib 35 is provided on the surface of the traverse 30 on the side of the base body 10 in this embodiment, the rib 35 may be provided on the surface of the base body 10 on the side of the traverse 30. Ribs 35 may be provided on the surfaces of the traverse 30 both on the side of the base body 10 and on the side of the traverse 30. Although the traverse 30 on the side of the insulators 34A and 34B are moved upward utilizing the approaching motion of the traverse 30 toward the base body 10 in the embodiment, this can be realized by other means which changes the height of the traverse 30 at the positions of the insulators 34A and 34B, e.g., means which changes heights of the insulators 34A and 34B.

The traverse 30 is operated in such a manner that the spindle motor 31A approaches or separates from the base body 10 around the insulators 34A and 34B as fulcrums.

A main slider 40 and a sub-slider 50 having cam mechanisms which operate the traverse 30 will be explained below.

Each of the main slider 40 and the sub-slider 50 has the cam mechanism which displaces the traverse 30. The main slider 40 and the sub-slider 50 are located on the side of the spindle motor 31A. The main slider 40 is disposed such that one end thereof is located on the side of a front surface of a chassis body 10 and the other end of the main slider 40 is located on the side of a rear surface of the chassis body 10. The sub-slider 50 is disposed between the traverse 30 and the rear base 13 in a direction perpendicular to the main slider 40.

The cam mechanisms which displace the traverse 30 comprise a first cam mechanism 41 and a second cam mechanism 51. The first cam mechanism 41 is provided on a surface of the main slider 40 on the side of the spindle motor 31A, and the second cam mechanism 51 is provided on a surface of the sub-slider 50 on the side of the spindle motor 31A.

A base member 15 is provided between the main slider 40 and the traverse 30, and a base member 16 is provided between the sub-slider 50 and the traverse 30. The base member 15 and the base member 16 are fixed to the base body 10, the base member 15 and the base member 16 limit a position of a cam pin 36 of the traverse 30 by a vertical groove formed in the base member 15, and limit a position of a cam pin 37 of the traverse 30 by a vertical groove formed in the base member 16.

Here, the base member 16 and the sub-slider 50 are connected to each other through a third cam mechanism (not shown in FIG. 1). The third cam mechanism has a function for moving the sub-slider 50 in a direction separating away from the base body 10 when the traverse 30 is moved in a direction separating away from the base body 10 by the second cam mechanism 51.

A loading motor 60 is disposed on the side of one end of the main slider 40. A drive shaft 61 of the loading motor 60 and the one end side of the main slider 40 are connected to each other through a gear mechanism. A worm gear 62 constituting the gear mechanism is provided on the drive shaft 61 of the loading motor 60.

The loading motor 60 is disposed such that its body is located in the central portion of the disk inserting opening 11, and the drive shaft 61 is located on the side of the end of the disk inserting opening 11.

The main slider 40 can slide in the longitudinal direction by operating the loading motor 60. The main slider 40 is connected to the sub-slider 50 by a cam lever 70.

The cam lever 70 has a turning fulcrum 71. The cam lever 70 engages a cam groove formed in an upper surface of the main slider 40 by pins 72 and 73, and engages a cam groove formed in an upper surface of the sub-slider 50 by a pin 74.

The cam lever 70 moves the sub-slider 50 at timing at which the traverse 30 is displaced by the first cam mechanism 41 of the main slider 40, operates the second cam mechanism 51 by movement of the sub-slider 50, and displaces the traverse 30.

The above-explained connector 12, traverse 30, rear base 13, printed substrate 14, insulators 34A and 34B, main slider 40, sub-slider 50, base member 15, base member 16 and loading motor 60 are formed in the deep portion 10A of the base body 10, and a disk-inserting space is formed between the lid and these members.

Next, a guide member which supports a disk when the disk is inserted, and a lever member operated when the disk is inserted will be explained.

A first disk guide 17 having a predetermined length is provided on one end side of the deep portion 10A near the disk inserting opening 11. The first disk guide 17 has a groove whose cross section as viewed from a disk-inserting side is of U-shape. A disk is supported by this groove.

A pull-in lever 80 is provided in the base body 10 on the other end side of the disk inserting opening 11. A second disk guide 81 is provided on a movable side end of the pull-in lever 80. The second disk guide 81 comprises a cylindrical roller, and is turnably provided on the movable side end of the pull-in lever 80. A groove is formed in a roller outer periphery of the second disk guide 81, and a disk is supported by this groove.

The pull-in lever 80 is disposed such that its movable side end is operated on the side of the disk inserting opening 11 than its stationary side end, and the pull-in lever 80 is provided at its stationary side end with a turning fulcrum 82.

Therefore, the stationary side end of the pull-in lever 80 which serves as a turning fulcrum 82 is disposed on an outer periphery of the base body 10, and the movable side end operates on the inner periphery of the base body 10.

A long groove 83 is formed between the movable side end and the stationary side end of a back surface of the pull-in lever 80 (surface on the side of the base body 10). A third disk guide 84 having a predetermined length is provided between the movable side end and the stationary side end of the surface of the pull-in lever 80.

The pull-in lever 80 is operated by a sub-lever 90.

The sub-lever 90 is provided at its movable side one end with a projection 91, and at its other end with a turning fulcrum 92. The projection 91 of the sub-lever 90 slides in the long groove 83 of the pull-in lever 80. The turning fulcrum 92 of the sub-lever 90 is located on the main slider 40. The turning fulcrum 92 does not move in association with the main slider 40, and is fixed to the base body 10 through the base member 15. A pin 93 is provided on a lower surface of the sub-lever 90 closer to the projection 91 than the turning fulcrum 92. The pin 93 slides in a cam groove formed in an upper surface of the main slider 40. Therefore, an angle of the sub-lever 90 is changed as the main slider 40 moves, and by changing the angle of the sub-lever 90, the turning angle of the pull-in lever 80 is changed. That is, the second disk guide 81 of the pull-in lever 80 approaches and separates from the spindle motor 31A by operating the sub-lever 90. The groove 83A extending in the turning direction of the sub-lever 90 is formed in an end of the long groove 83 close to the movable side end of the pull-in lever 80. Even if the turning angle of the sub-lever 90 is varied when the second disk guide 81 pulls a disk to the deepest position by the groove 83A, the turning angle of the pull-in lever 80 is not varied, and the pull-in amount of the disk can be stabilized.

A discharge lever 100 is provided on a side portion of the base body 10 which is different from the pull-in lever 80. A guide 101 is provided on a movable side end of one end side of the discharge lever 100. A turning fulcrum 102 is provided on the other end side of the discharge lever 100. An abutting portion 103 is provided on the movable side end of the discharge lever 100 closer to a rear surface thereof than the guide 101. An elastic body 104 is provided on the discharge lever 100. One end of the elastic body 104 is fixed to the discharge lever 100 and the other end thereof is fixed to the rear base 13. When the abutting portion 103 is pulled toward the rear surface by the elastic body 104, the abutting portion 103 abuts against an abutting portion 13A of the rear base 13. The discharge lever 100 is pulled out toward the disk inserting opening 11 by an elastic force of the elastic body 104. Therefore, the stationary side end of the discharge lever 100 which serves as a turning fulcrum 102 is disposed on the outer periphery of the base body 10, and the movable side end operates on the inner periphery of the base body 10. The discharge lever 100 is operated in association with motion of the main slider 40 through the link arm 105 and the discharge slider 106. The link arm 105 connects the main slider 40 and the discharge slider 106 with each other, and the discharge lever 100 engages the cam groove of the discharge slider 106 by a com pin.

A restriction lever 110 is provided on the side of the rear surface of the base body 10. An end of the restriction lever 110 on the side of the rear surface is a turning fulcrum 111, and its movable side end has a guide 112. A portion of the restriction lever 110 on the side of the guide 112 is always biased to project toward the front surface by an elastic body 113. Therefore, the stationary side end of the restriction lever 110 which serves as the turning fulcrum 111 is disposed on the outer periphery of the base body 10, and the movable side end operates on the inner periphery of the base body 10. The restriction lever 110 operates a limit switch at a predetermined position. That is, if a disk is inserted to a predetermined position, the limit switch is turned off and the loading motor 60 is operated. By the rotation of the loading motor 60, the main slider 40 slides.

A guide lever 180 is provided on a side of the base body 10 on the same side as the discharge lever 100. A rear surface side of the guide lever 180 is a turning fulcrum 181, and a guide 182 is provided on a movable side of the guide lever 180. The guide lever 180 is biased such that a portion thereof on the side of the guide 182 is projects toward a disk by an elastic body 183. The guide lever 180 moves in association with the main slider 40 through the link arm 105 and the discharge slider 106, and a portion of the guide lever 180 on the side of the guide 182 separates from the disk in accordance with the motion of the main slider 40.

A protect mechanism 120 is provided inside of the disk inserting opening 11. When a disk is already set in the chassis outer sheath, the protect mechanism 120 prevents another disk from being inserted from the disk inserting opening 11. The traverse 30 near the spindle motor 31A includes an opening, and a pin 18 projecting from the base body 10 toward the lid is provided in the opening. In a state where the traverse 30 moves closest to the base body 10, the pin 18 has a height projecting toward the lid than the hub 31B of the spindle motor 31A, and in a driving state of the spindle motor 31A (operating state where it is possible to replay and record), the pin 18 has a height pulled toward the base body 10 than the hub 31B of the spindle motor 31A. It is preferable that that pin 18 is located at a position corresponding to a non-recording surface of a center portion of a disk which is set on the spindle motor 31A, and at a position further from the insulator 34 than the spindle motor 31A.

A front guider 21 and a traverse felt 22 are provided on the base body 10 on its front surface side. The front guider 21 is disposed on the side of one end of the disk inserting opening 11 and between the pull-in lever 80 and the disk inserting opening 11. The front guider 21 is provided closer to the lid than the loading motor 60, the gear mechanism and the main slider 40 such as to cover portions of these members. The periphery of the front guider 21 is tapered so that the entire recording surface of a disk to be inserted does not come into contact with the front guider 21, and a surface of the front guider 21 is coated with urethane fluorine. The traverse felt 22 is provided closer to the lid than the traverse 30 such as to partially cover the traverse 30 on the side of the disk inserting opening 11. A central portion of the traverse felt 22 swells such that the entire recording surface of a disk to be inserted does not come into contact with the traverse felt 22, and the traverse felt 22 is made of felt. The front guider 21 and the traverse felt 22 can prevent the recording surface from being damaged by the inclination toward a surface of a disk when the disk can not sufficiently be supported by the first disk guide 17 or the second disk guide 81. The front guider 21 may be made of felt, and the traverse felt 22 may be coated with fluorine-based material in which urethane resin beads are mixed. A projecting guide may be provided on a portion of a surface of the traverse 30 which is located on an outer side than an outer peripheral end of a disk in which the disk is set on the spindle motor 31A and which is located on the side of the disk inserting opening 11. This projecting guide can form a portion of the traverse felt 22 in a projecting form. This projecting guide may be provided instead of providing the traverse felt 22. In this case, it is preferable that the projecting guide surface is coated with fluorine in which urethane resin beads are mixed. It is preferable to use a coating material in which 5% fluorine and 1.0 to 1.5% silicon are mixed in urethane resin having beads whose diameter is 20 microns. Friction coefficient of the coating material is preferably in a range of 0.2 to 0.6, and more preferably equal to or less than 0.55.

Next, the lid of the disk apparatus will be explained using FIG. 2.

A plurality of screw holes 131 are provided in an outer edge of the lid 130. The lid 130 is mounted on the base body 10 by means of screws.

The lid 130 is formed at its central portion with an opening 132. The opening 132 is a circular opening having a radius greater than that of the center hole of the disk. Therefore, the opening 132 is greater than the hub 31B of the spindle motor 31A which is fitted into the central hole of the disk.

A narrowed portion 133 projecting toward the base body 10 is formed on an outer peripheral portion of the opening 132. The opening 132 is provided with a narrowed portion 134 which is tapered from the narrowed portion 133 toward the disk inserting opening 11. A projecting guide is formed on the side of the base body 10 by the narrowed portion 134. A plurality of narrowed portions 135A, 135B, 135C and 135D are formed on the lid 130, and a projecting guide is formed on the side of the base body 10 by the narrowed portions 135A, 135B, 135C and 135D.

The narrowed portions 135A, 135B, 135C and 135D are provided on the outer side from the outer peripheral end of a disk 1C in a state where the disk is set on the spindle motor 31A, and closer to the disk inserting opening 11 than the opening 132. Disks 1A and 1B inserted from the disk inserting opening 11 are guided by the projecting guide formed by the narrowed portions 135A, 135B, 135C and 135D. The strength of the lid 130 is enhanced by the narrowed portions 133, 134, 135A, 135B, 135C and 135D. The narrowed portions 135A and 135C, or the narrowed portions 135B and 135D may be a continuous single narrowed portion, but if they are divided, the strength of the lid 130 can further be enhanced.

The entire inner peripheral surface of the lid 130 is coated with fluorine in which urethane resin beads are mixed. Only contact surfaces of the lid 130 with respect to the narrowed portion 133, the tapered narrowed portion 134 and the narrowed portions 135A, 135B, 135C and 135D with respect to a disk may be coated. In this case also, it is preferable to use a coating material in which 5% fluorine and 1.0 to 1.5% silicon are mixed in urethane resin having beads whose diameter is 20 microns. Friction coefficient of the coating material is preferably in a range of 0.2 to 0.6, and more preferably equal to or less than 0.55.

Next, a guide 101 of the discharge lever 100 will be explained using FIG. 4.

The guide 101 comprises a shaft 101A fixed to the discharge lever 100, a stationary portion 101B fixed to the discharge lever 100 by the shaft 101A, a movable portion 101C which is displaced with respect to the stationary portion 101B, and an elastic body 101D which biases the movable portion 101C in a direction away from the stationary portion 101B.

The shaft 101A comprises a columnar material having a predetermined length whose one end is fitted and fixed to a hole formed in the discharge lever 100.

One end of the stationary portion 101B is fixed by the shaft 101A, an outer diameter of one end of the stationary portion 101B on the side of the discharge lever 100 is set greater than an outer diameter thereof on the side of the movable portion 101C. An outer peripheral surface of the stationary portion 101B is inclined. An inner peripheral diameter of the stationary portion 101B is set greater than an outer diameter of the shaft 101A.

The movable portion 101C comprises a cylindrical member. An inner peripheral surface of the movable portion 101C slides on an outer peripheral surface of the shaft 101A, and an outer peripheral surface of the movable portion 101C slides on an inner peripheral surface of the stationary portion 101B. An end of the movable portion 101C on the side of the discharge lever 100 abuts against the elastic body 101D, and a ring-like rib 101E is provided on an end of the movable portion 101C on the side of the lid 130.

The elastic body 101D comprises a conical coil spring whose outer diameter on the side of the discharge lever 100 is set greater than an outer diameter thereof on the side of the movable portion 101C. One end of the elastic body 101D abuts against the shaft 101A and the stationary portion 101B, and the other end of the elastic body 101D abuts against the movable portion 101C.

The guide 101 of the discharge lever 100 has been explained with reference to FIG. 4. If the second disk guide 81 of the pull-in lever 80, the guide 112 of the restriction lever 110 and the guide 182 of the guide lever 180 have the same structure as that of the guide 101, a gap of the lid 130 with respect to the second disk guide 81, the guide 112, and the guide 182 can be eliminated, and the disk 1 can reliably be held.

Motions of various members when a disk is inserted will be explained using FIGS. 5 to 17.

Figure 5:
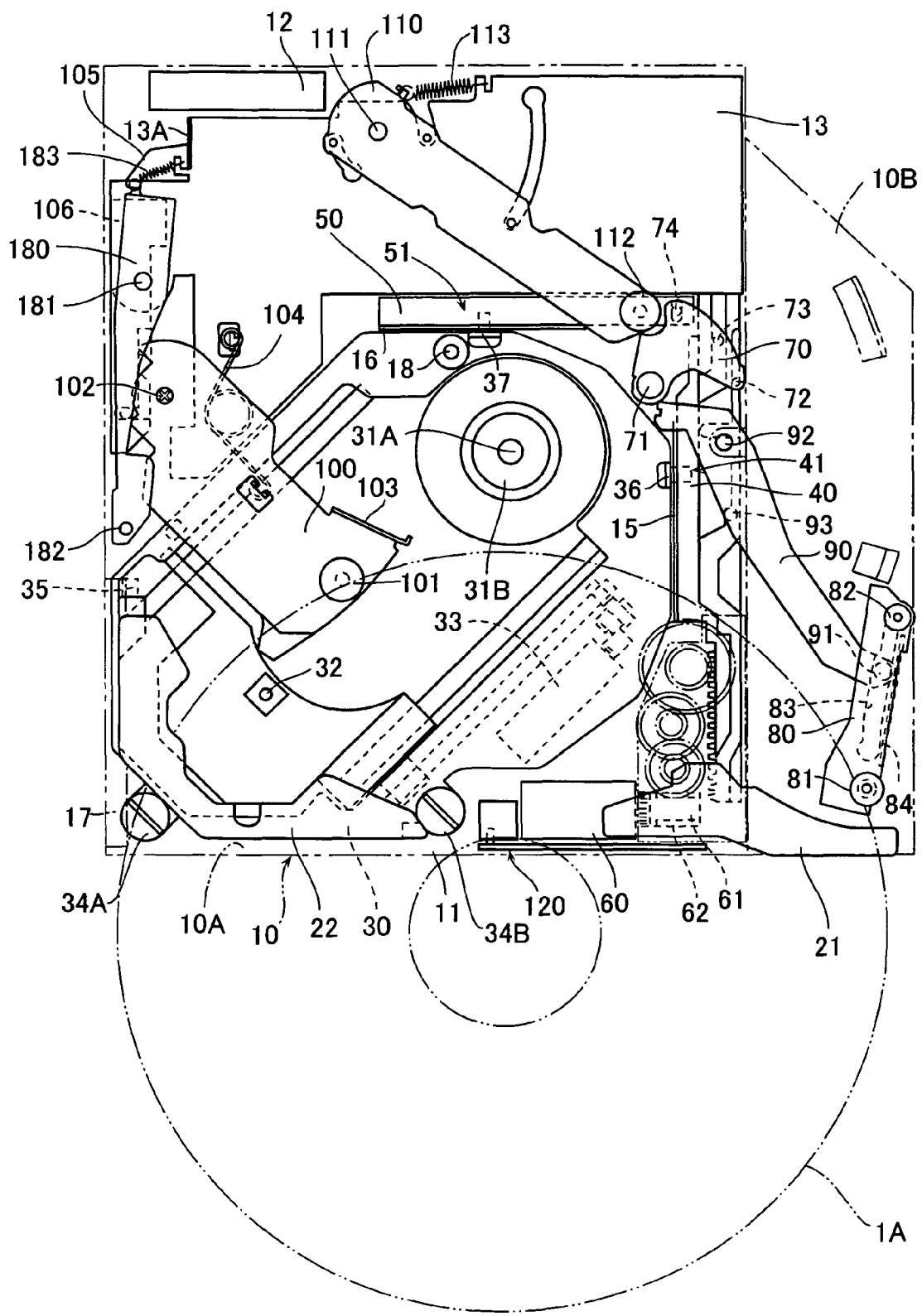
FIG. 5 is a plan view of the base body of the disk apparatus showing an inner surface of a disk inserting operation of the embodiment.
Figure 6:
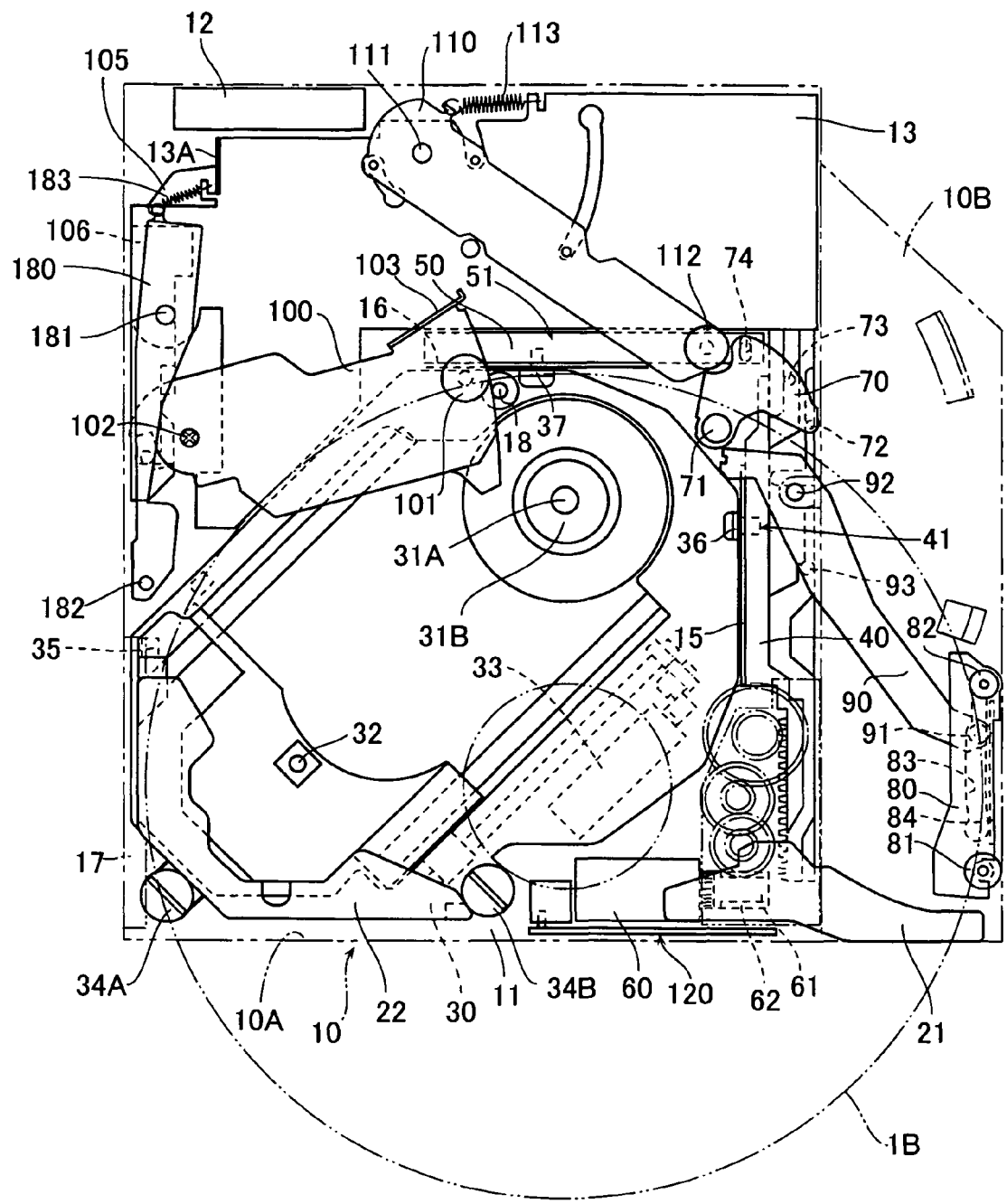
FIG. 6 is a plan view of the base body of the disk apparatus showing an intermediate stage of the disk inserting operation of the embodiment.
Figure 7:
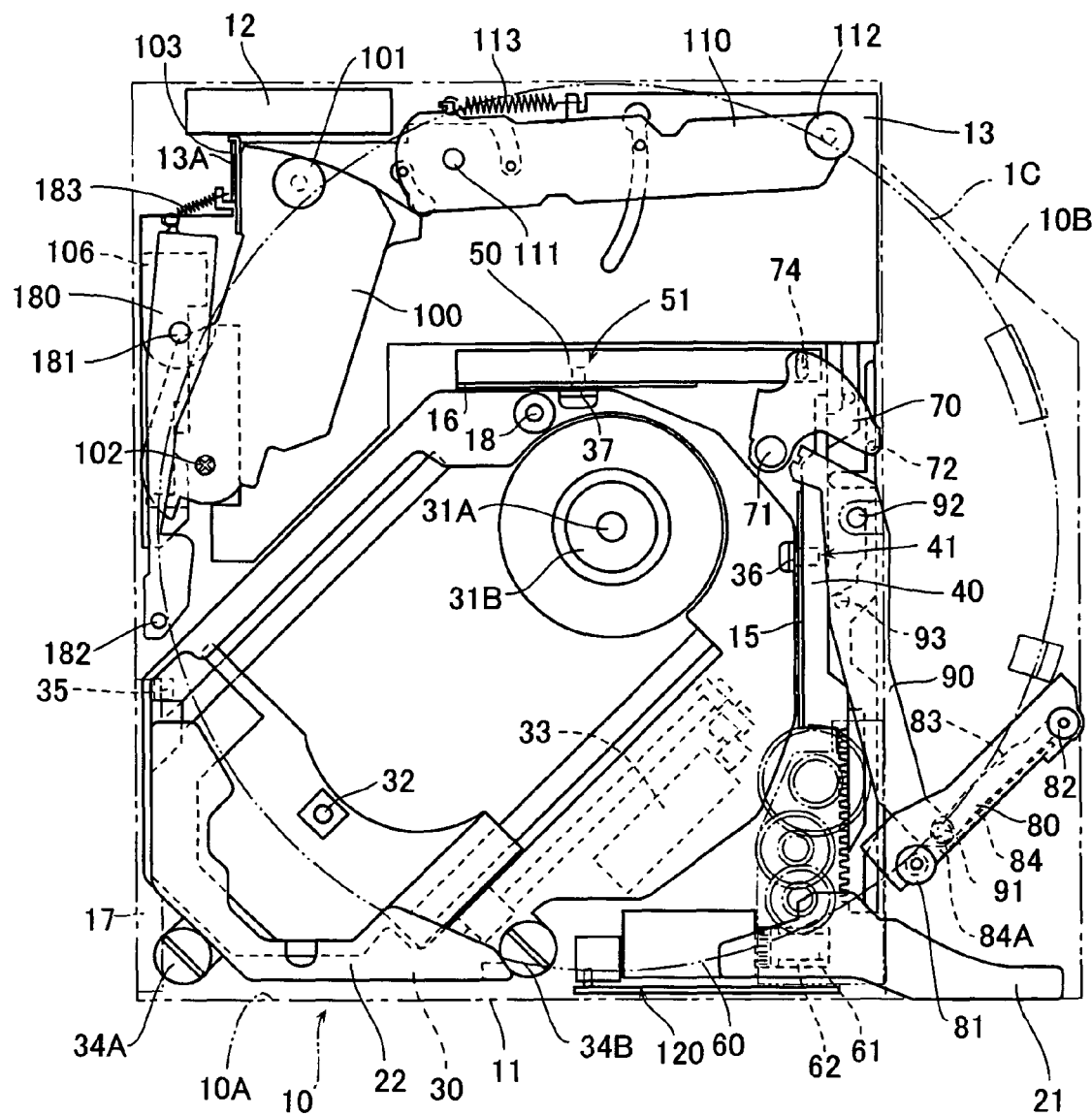
FIG. 7 is a plan view of the base body of the disk apparatus showing a completed stage of the disk inserting operation of the embodiment.
Figure 8:
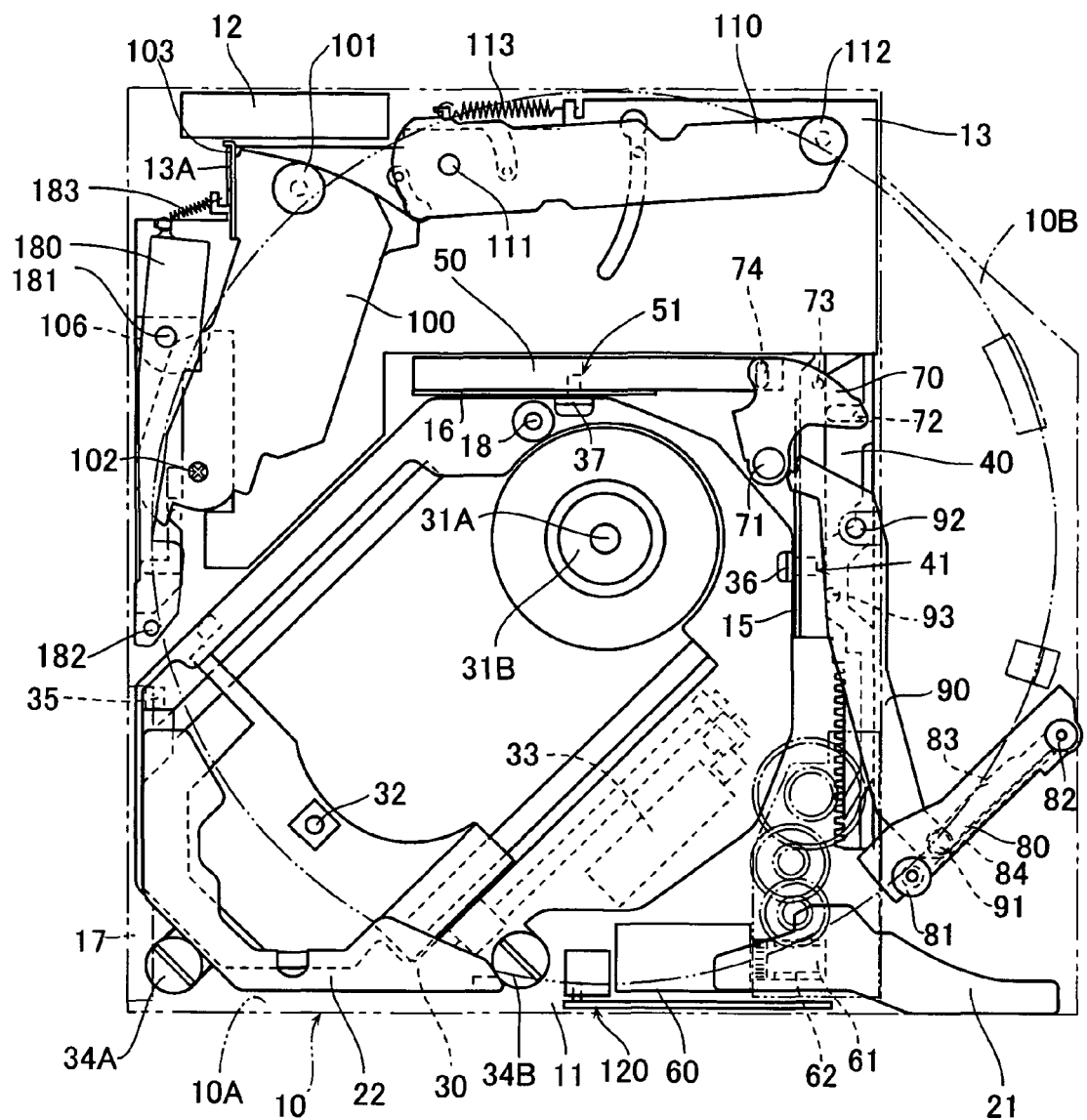
FIG. 8 is a plan view of the base body of the disk apparatus showing a stage after a predetermined time is elapsed from the state shown in FIG. 7.
Figure 9:
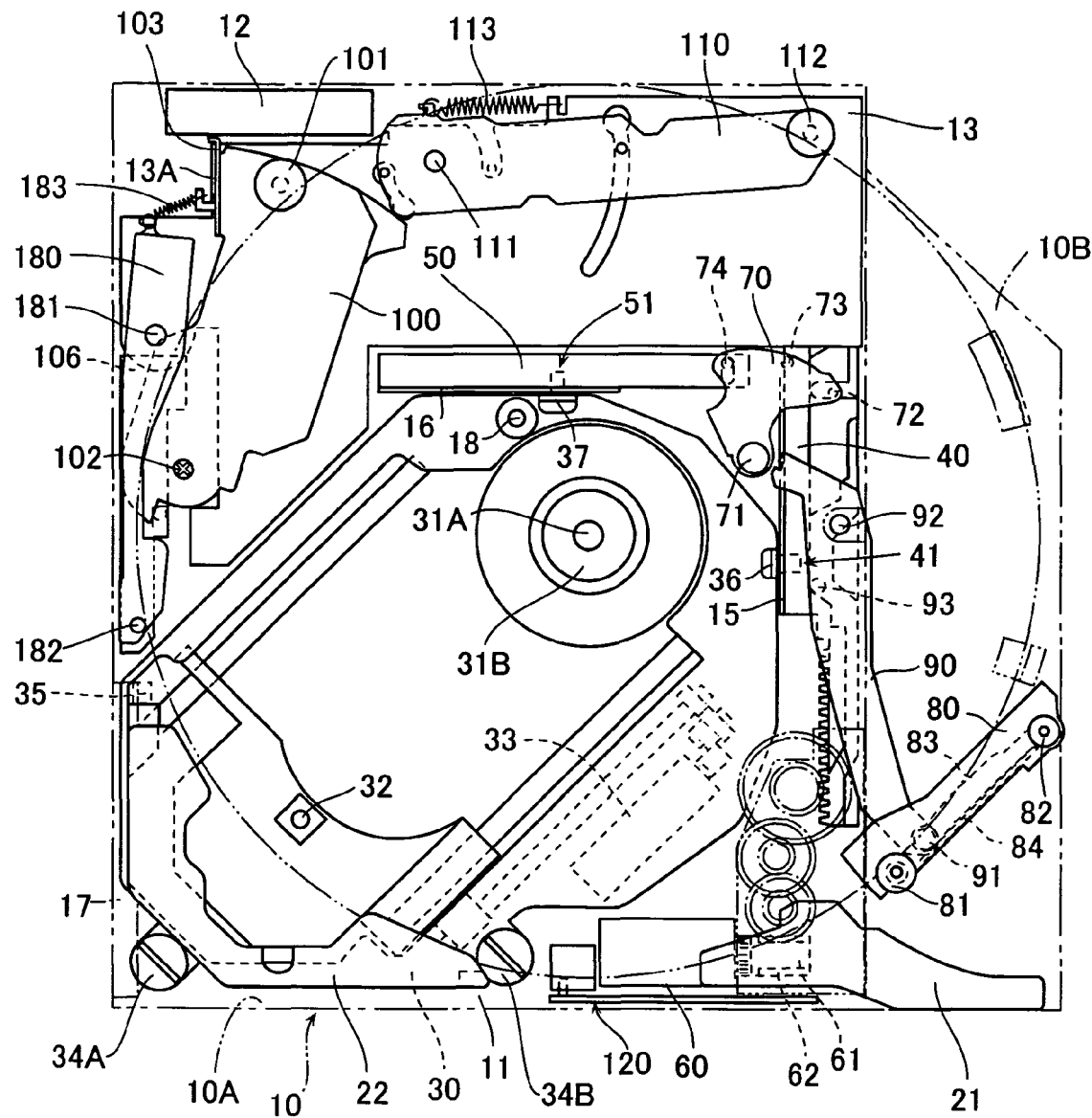
FIG. 9 is a plan view of the base body of the disk apparatus showing a state in which a traverse is operated in a direction where a spindle motor side comes closest to the lid.
Figure 10:
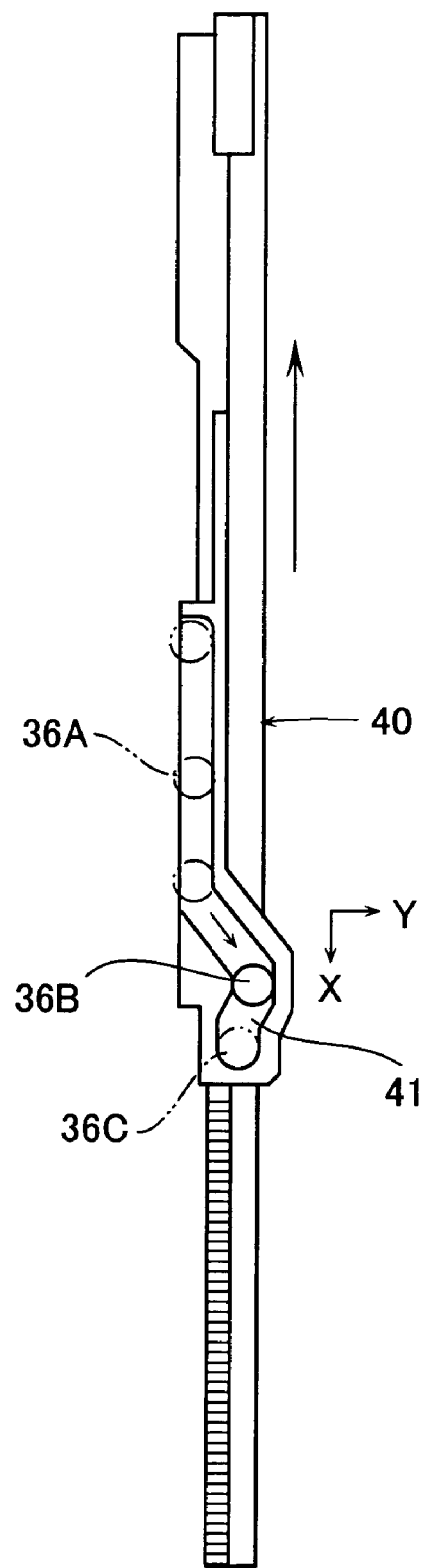
FIG. 10 is a sectional view of a main slider showing a first cam mechanism of the embodiment.
Figure 11:
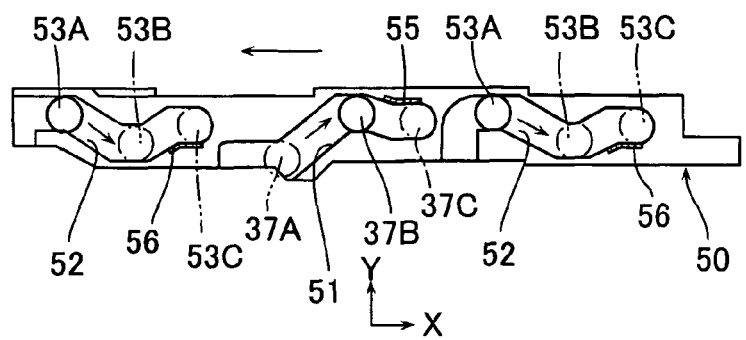
FIG. 11 is a side view of a sub-slider showing a second cam mechanism and a third cam mechanism of the embodiment.
Figure 12:
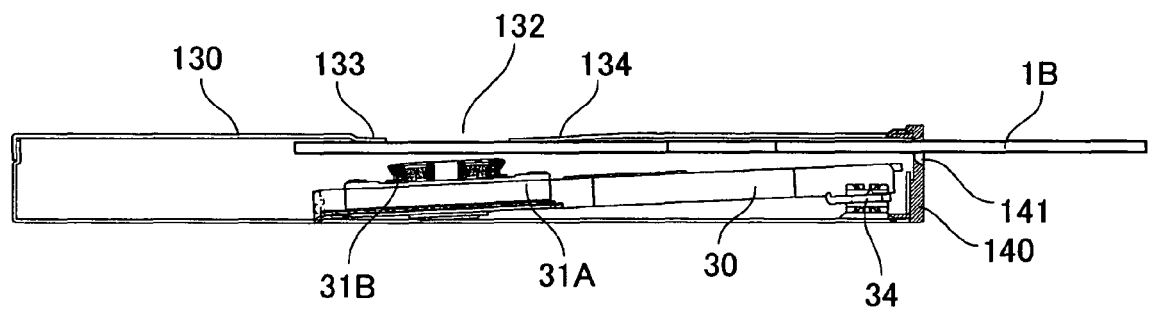
FIG. 12 is a side sectional view of an essential portion of the disk apparatus showing the state shown in FIG. 6.
Figure 13:
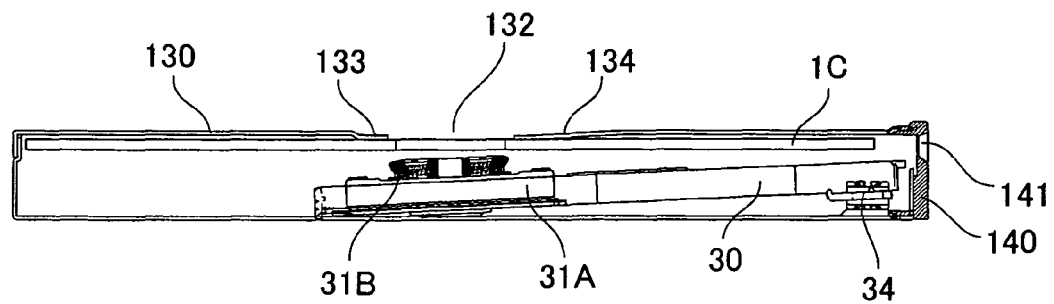
FIG. 13 is a side sectional view of an essential portion of the disk apparatus showing the state shown in FIGS. 7 and 8.
Figure 14:
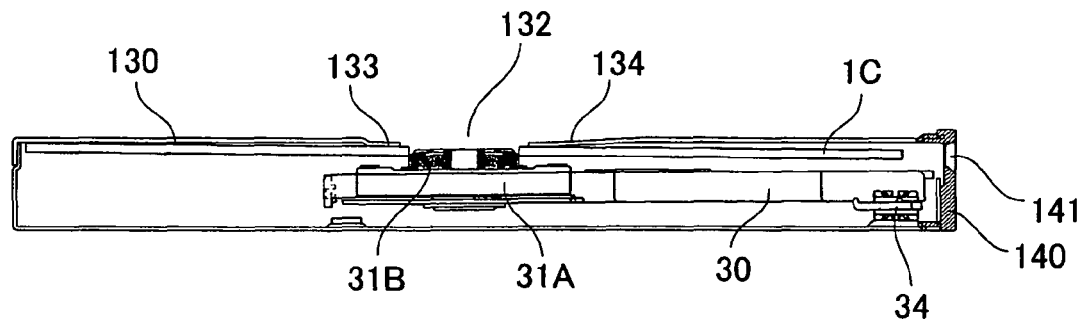
FIG. 14 is a side sectional view of an essential portion of the disk apparatus showing a state immediately before chucking.
Figure 15:
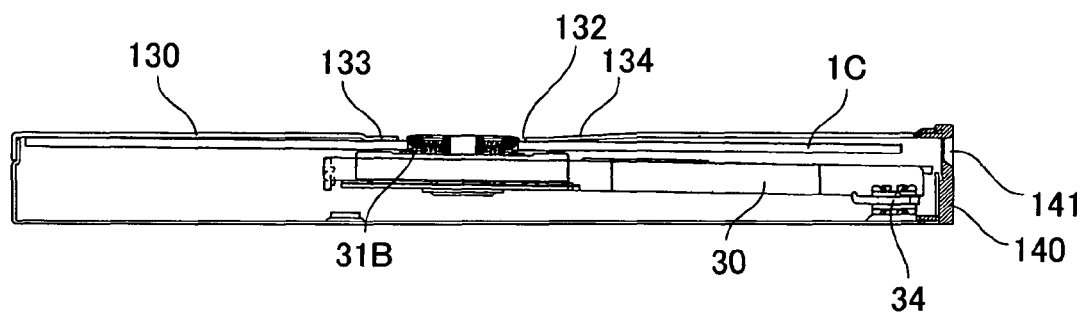
FIG. 15 is a side sectional view of an essential portion of the disk apparatus showing the state shown in FIG. 9.
Figure 16:
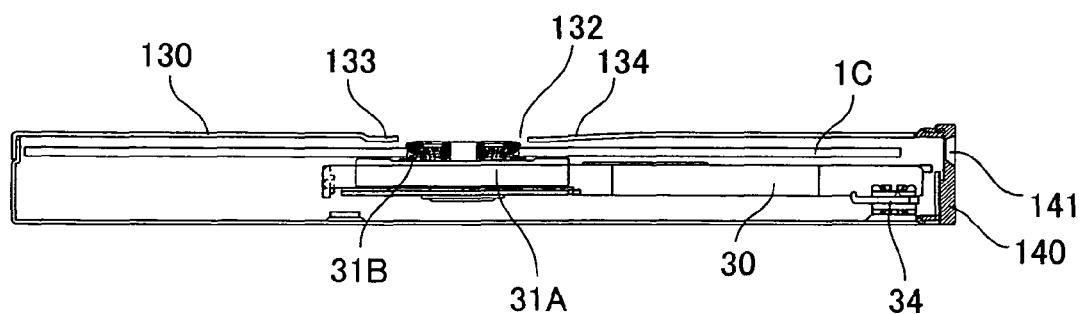
FIG. 16 is a side sectional view of an essential portion of the disk apparatus showing a replaying operation of a disk.
Figure 17:
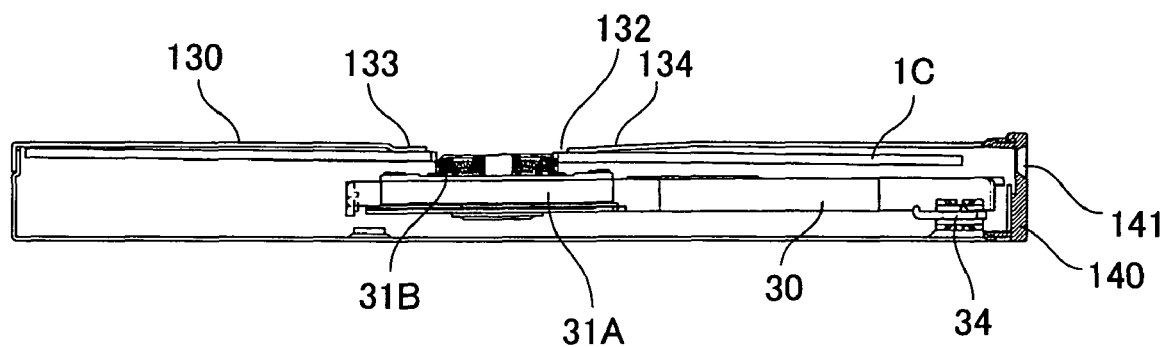
FIG. 17 is a side sectional view of an essential portion of the disk apparatus showing a case in which a center of the disk and a center of a hub are deviated from each other in the state shown in FIG. 14.

FIG. 5 is a plan view of the base body of the disk apparatus showing an initial stage of a disk inserting operation of the embodiment. FIG. 6 is a plan view of the base body of the disk apparatus showing an intermediate stage of the disk inserting operation of the embodiment. FIG. 7 is a plan view of the base body of the disk apparatus showing a completed stage of the disk inserting operation of the embodiment. FIG. 8 is a plan view of the base body of the disk apparatus showing a stage after a predetermined time is elapsed from the state shown in FIG. 7. FIG. 9 is a plan view of the base body of the disk apparatus showing a state in which a traverse is operated in a direction where a spindle motor side comes closest to the lid. FIG. 10 is a sectional view of a main slider showing a first cam mechanism of the embodiment. FIG. 11 is a side view of a sub-slider showing a second cam mechanism and a third cam mechanism of the embodiment. FIG. 12 is a side sectional view of an essential portion of the disk apparatus showing the state shown in FIG. 6. FIG. 13 is a side sectional view of an essential portion of the disk apparatus showing the state shown in FIGS. 7 and 8. FIG. 14 is a side sectional view of an essential portion of the disk apparatus showing a state immediately before chucking. FIG. 15 is a side sectional view of an essential portion of the disk apparatus showing the state shown in FIG. 9. FIG. 16 is a side sectional view of an essential portion of the disk apparatus showing a replaying operation of a disk. FIG. 17 is a side sectional view of an essential portion of the disk apparatus showing a case in which a center of the disk and a center of a hub are deviated from each other in the state shown in FIG. 14.

FIG. 5 shows a state of a disk 1A shown in FIG. 2.

When the disk 1 is not inserted, the pull-in lever 80 is in a standby state where the pull-in lever 80 is turned toward the spindle motor 31A through a predetermined angle. In this state, the projection 91 of the sub-lever 90 is located at the movable side end of the long groove 83 before the groove 83A. A distance between the guide 17 and the second disk guide 81 is smaller than a diameter of the disk 1.

In the initial stage when the disk 1 is to be inserted, the disk 1A is first abuts against the guide 17 and the second disk guide 81, the disk 1A is supported by the guide 17 and the second disk guide 81 and its position is restricted. At that time, if the second disk guide 81 has the structure as shown in FIG. 4, a gap between the second disk guide 81 and the lid 130 can be eliminated, and it is possible to reliably hold the disk 1A by the movable portion of the second disk guide 81.

If the disk 1A is further pushed in, the second disk guide 81 is turned in a direction away from the spindle motor 31A together with the inserting motion. With this turning motion of the second disk guide 81, the projection 91 of the sub-lever 90 slides in the long groove 83 toward the stationary side end. Therefore, the sub-lever 90 also turns around the turning fulcrum 92. If the disk 1A is further inserted, the disk 1A abuts against the guide 101 of the discharge lever 100. At that time, since no gap is generated between the guide 101 and the lid 130, it is possible to reliably hold the disk 1A by the movable portion 101C of the guide 101.

In the state shown in FIG. 5, the loading motor 60 is not operated and thus, the main slider 40 and the sub-slider 50 are not operated either. An upper surface of the disk 1A slides while being in contact with the projecting guide formed by the narrowed portions 135A, 135B, 135C and 135D of the lid 135 shown in FIG. 2, and a lower surface of the disk 1A slides while being contact with the front guider 21 and the traverse felt 22 shown in FIG. 1.

FIGS. 6 and 12 show a state of the disk 1B shown in FIG. 2.

If the disk 1 is further inserted from the state shown in FIG. 5, one end of the disk is supported by the guide 17 and in this state, the other end thereof is supported by the third disk guide 84. The pull-in lever 80 is most separated from the spindle motor 31A in this state. In this state, the projection 91 of the sub-lever 90 is located at the stationary side end of the long groove 83. A distance between the guide 17 and the second disk guide 81 is substantially the same as a diameter of the disk 1. Since the guide 101 is pushed by the disk 1B, the discharge lever 100 keeps turning together with the inserting motion of the disk. An upper surface of the disk 1A slides while being in contact with the projecting guide formed by the narrowed portions 135A, 135B, 135C and 135D of the lid 135 shown in FIG. 2, and slides while being contact with the narrowed portions 133 and 134 as shown in FIG. 12.

If the disk 1B is further pushed in from the state shown in FIG. 6, the second disk guide 81 moves toward the spindle motor 31A together with the inserting motion. As the second disk guide 81 turns, the projection 91 of the sub-lever 90 slides in the long groove 83 from the stationary side end toward the movable side end. Therefore, the sub-lever 90 also turns around the turning fulcrum 92.

In the above motion process, the disk 1B abuts against the guide 112 of the restriction lever 110, and the restriction lever 110 turns. At that time, if the guide 112 has the structure shown in FIG. 4, a gap between the guide 112 and the lid 130 can be eliminated, and it is possible to reliably hold the disk 1B by the movable portion of the guide 112.

When the second disk guide 81 turns toward the spindle motor 31A through a predetermined angle, the restriction lever 110 also turns through a predetermined angle by the disk 1B. If the restriction lever 110 turns through the predetermined angle, the limit switch is operated, and the loading motor 60 starts rotating. The guide 182 of the guide lever 180 projects toward the disk 1B, and the disk 1B is supported also by the guide 182 and slides. At that time, if the guide 182 has the structure shown in FIG. 4, a gap between the guide 182 and the lid 130 can be eliminated, and it is possible to reliably hold the disk 1B by the movable portion of the guide 182.

The main slider 40 starts sliding toward the rear surface by the rotation of the loading motor 60. By the motion of the main slider 40, the pin 93 of the sub-lever 90 moves along the cam groove provided in the corresponding main slider 40. At that time, the pin 93 moves toward the spindle motor 31A by the corresponding cam groove. By the movement of the pin 93, the sub-lever 90 biases the pull-in lever 80 in a direction in which the movable side end thereof turns and moves toward the spindle motor 31A. Therefore, the pull-in lever 80 biases the disk 1B in the inserting direction. By this biasing force of the pull-in lever 80, the disk is further pushed in without manual operation.

FIGS. 7 and 13 show a state of the disk 1C shown in FIG. 2.

The disk 1C is supported by three points, i.e., the second disk guide 81, the guide 182 of the guide lever 180 and the guide 112 of the restriction lever 110, and a center hole of the disk 1C is restricted to a position corresponding to the spindle motor 31A.

The loading motor 60 keeps rotating, and the main slider 40 also keeps sliding.

The main slider 40 moves for a predetermined time from the state shown in FIG. 7, but since the cam groove corresponding to the pin 93 of the sub-lever 90 is in parallel to the moving direction, the sub-lever 90 is not operated. In this state, the projection 91 of the sub-lever 90 is located in the groove 83A. The pull-in lever 80 is not operated, and the state where the disk 1C is supported is maintained.

The cam lever 70 is not yet operated for a predetermined time from the state shown in FIG. 7. That is, cam grooves corresponding to the pins 72 and 73 of the cam lever 70 are formed in parallel to the moving direction of the main slider 40.

FIG. 8 shows a stage after a predetermined time is elapsed from the state shown in FIG. 7. The state of the traverse 30 shown in FIG. 13 is maintained from the state shown in FIG. 7 to the state shown in FIG. 8.

If the loading motor 60 is operated to move the main slider 40 from the state shown in FIG. 8, the cam lever 70 turns around the turning fulcrum 71 by the pin 72. By the turning motion of the cam lever 70, the sub-slider 50 slides in a direction away from the main slider 40.

The traverse 30 is operated by the sliding motions of the main slider 40 and the sub-slider 50 from the state shown in FIG. 8. That is, from the state shown in FIG. 13, the spindle motor 31A side of the traverse 30 start moving toward the lid 130 as shown in FIG. 14. The pull-in lever 80 keeps holding the disk 1C.

FIG. 9 shows a state in which the traverse 30 is operated in a direction where the spindle motor 31A comes closest to the lid 130. The traverse 30 on the side of the spindle motor 31A rises to the uppermost position as shown in FIG. 15, and the hub 31B is fitted into the hole of the disk 1C and chucking is carried out.

After chucking of the hub 31B to the hole of the disk 1C, the traverse 30 on the side of the spindle motor 31A is slightly lowered and disposed for replaying or recording operation of the disk.

In the state shown in FIG. 14, when the center of the disk 1C and the center of the hub 31B match with each other, if the traverse 30 on the side of the spindle motor 31A is moved upward, chucking can be carried out as shown in FIG. 15. If the center of the disk 1C and the center of the hub 31B are deviated from each other due to outer diameter tolerance of the disk 1C or variation in apparatus parts as shown in FIG.

17, it is necessary to laterally slide the disk 1C to an appropriate position. In this embodiment, since the lower surfaces of the narrowed portions 133 and 134 are coated with the fluorine in which urethane resin beads are mixed, the disk 1C can slide laterally to the appropriate position by a pressing force of the hub 31B to the disk 1C, and the chucking can be carried out smoothly.

Next, the motion mechanism of the traverse 30 will be explained in detail using FIGS. 10 to 16.

As shown in FIG. 10, the main slider 40 is provided with a long groove constituting the first cam mechanism 41. The cam pin 36 fixed to the traverse 30 is slidably provided in the long groove. The first cam mechanism 41 comprises the long groove and the cam pin 36.

As shown in FIG. 11, the sub-slider 50 is provided with a long groove constituting the second cam mechanism 51. The cam pin 37 fixed to the traverse 30 is slidably provided in the long groove. The second cam mechanism 51 comprises the long groove and the cam pin 37. The sub-slider 50 is provided at its both ends with two long grooves which constitute third cam mechanism 52 and which have the same shapes. A cam pin 53 fixed to the base member 16 is slidably provided in each of the long grooves. The third cam mechanism 52 comprises the long grooves and the cam pins 53.

A cam pin 36A in FIG. 10 and cam pins 37A and 53A in FIG. 11 show a state of the FIGS. 8 and 13 before the traverse 30 is operated.

A cam pin 36B in FIG. 10 and cam pins 37B and 53B in FIG. 11 show a state shown in FIGS. 9 and 15 in which the traverse 30 is moved in a direction in where the spindle motor 31A side comes closest to the lid 130.

Arrows in FIGS. 10 and 11 show moving directions of the main slider 40 and the sub-slider 50, respectively.

As shown in FIG. 10, the cam pin 36 moves from the position of the cam pin 36A to the position of the cam pin 36B, thereby operating the traverse 30. Therefore, in the position of the cam pin 36 of the traverse 30, the traverse 30 moves from the position of the cam pin 36A to the position of the cam pin 36B with respect to the base body 10 by a moving distance in the Y axis direction.

As shown in FIG. 11, the cam pin 37 moves from the position of the cam pin 37A to the position of the cam pin 37B, thereby operating the cam pin 37 moves the traverse 30 with respect to the sub-slider 50. Therefore, in the position of the cam pin 36 of the traverse 30, the traverse 30 moves from the position of the cam pin 36A to the position of the cam pin 36B with respect to the sub-slider 50 by the moving distance in the Y axis direction. If the cam pin 53 moves from the position of the cam pin 53A to the position of the cam pin 53B, the cam pin 53 moves the sub-slider 50 with respect to the base body 10. Therefore, in the position of the cam pin 36 of the traverse 30, the sub-slider 50 moves from the position of the cam pin 53A to the position of the cam pin 53B with respect to the base body 10 by the moving distance in the Y axis direction. On the side of the sub-slider 50, the traverse 30 moves in the Y axis direction with respect to the base body 10 by a total moving distance of the moving distance in the Y axis direction from the position of the cam pin 36A to the position of the cam pin 36B and the moving distance in the Y axis direction from the position of the cam pin 53A to the position of the cam pin 53B.

In the embodiment, the moving distance in the Y axis direction from the from the position of the cam pin 36A to the position of the cam pin 36B shown in FIG. 10 is the same as a total moving distance of the moving distance in the Y axis direction from the position of the cam pin 37A to the position of the cam pin 37B shown in FIG. 11 and the moving distance in the Y axis direction from the position of the cam pin 53A to the position of the cam pin 53B.

In the state where the apparatus is operated in the above manner and the spindle motor 31A side of the traverse 30 comes closest to the lid 130, the disk 1 abuts against the lid 130 and is pressed by the spindle motor 31A and the lid 130 as shown in FIG. 15. By this pressing force, the hub 31B of the spindle motor 31A is fitted to the center hole of the disk 1, and the chucking operation is completed.

If the chucking operation is completed, the spindle motor 31A side of the traverse 30 separates from the lid 130, and is brought into a state shown in FIG. 16.

This motion is carried out by further rotating the loading motor 60 to move the main slider 40.

The motion from the completion of the chucking operation to the operation state in which the spindle motor 31A can replay and record (driving state) is carried out by moving the cam pin 36 from the position of the cam pin 36B to the position of the cam pin 36C in the main slider 40, and by moving the cam pin 37 from the position of the cam pin 37B to the position of the cam pin 37C, and by moving the cam pin 53 from the position of the cam pin 53B to the position of the cam pin 53C in the sub-slider 50.

When the spindle motor 31A is in an operative state (driving state) where the spindle motor 31A can replay and record, the support of the disk 1 by the second disk guide 81 of the pull-in lever 80, the guide 112 of the restriction lever 110 and the guide 182 of the guide lever 180 is released, and the disk 1 is held only by the hub 31B of the spindle motor 31A. The second disk guide 81 of the pull-in lever 80, the guide 112 of the restriction lever 110 and the guide 182 of the guide lever 180 are operated by the moving motion of the main slider 40.

As shown in FIG. 11, the second cam mechanism 51 of the sub-slider 50 is provided with an elastic body 55 comprising a leaf spring for example, and the third cam mechanism 52 is provided with an elastic body 56 comprising a leaf spring for example. The elastic body 55 and the elastic body 56 are provided such that a biasing direction of the elastic body 55 against the cam pin 37 and a biasing direction of the elastic body 56 against the cam pin 53 are different. It is preferable that the biasing directions of the elastic body 55 and the elastic body 56 are opposite from each other.

When the set disk 1 is discharged, the loading motor 60 is rotated to move the main slider 40. Basically, the above procedure is carried out reversely.

The operation required until the set disk is discharged will be explained briefly.

First, based on an ejection command, the loading motor 60 is rotated, and the main slider 40 moves toward the disk inserting opening 11.

Therefore, in the main slider 40, the cam pin 36 moves from the position of the cam pin 36C to the position of the cam pin 36A through the position of the cam pin 36B. In the sub-slider 50, the cam pin 37 moves from the position of the cam pin 37C to the position of the cam pin 37A through the position of the cam pin 37B, and the cam pin 53 moves from the cam pin 53C to the cam pin 53A through the position of the cam pin 53B.

If the cam mechanisms are moved, the disk 1 once moves toward the lid 130 and then moves toward the base body 10.

When the disk 1 moves toward the base body 10, the disk 1 abuts against eh second disk guide 81, the guides 112 and 182 on the side of the outer periphery of the disk 1, and abuts against the pin 18 on the side of the inner periphery of the disk 1. Therefore, as the traverse 30 moves toward the base body 10, a force acting toward the lid 130 is applied to the disk 1 from the second disk guide 81, the guides 112 and 182 and the pin 18, and the disk 1 is released from the hub 31B of the spindle motor 31A. If the pin 18 is provided at the position of the outer periphery of the spindle motor 31A and further from the insulator 34 than the spindle motor 31A as in this embodiment, the disk 1 can be released from the hub 31B of the spindle motor 31A even when the second disk guide 81 and the guides 112 and 182 do not function.

Thereafter, the locked state of the discharge lever 100 is released by the motion of the main slider 40, and the movable side end of the discharge lever 100 turns toward the disk inserting opening 11 by the elastic force of the elastic body 104. Therefore, the disk 1 released from the hub 31B of the spindle motor 31A is pushed out toward the disk inserting opening 11 by the discharge lever 100. In the state where the discharge lever 100 moves, the pull-in lever 80 is held in a state where its movable side end moves in a direction where the movable side end is most separated from the spindle motor 31A. The position of the pull-in lever 80 may be a position where the second disk guide 81 is not in contact with the disk 1. When a disk is to be discharged, if the pull-in lever 80 is disposed at a position where the disk 1 is not in abutment against the second disk guide 81, trouble caused when a disk is discharged can be prevented.

Figure 18:
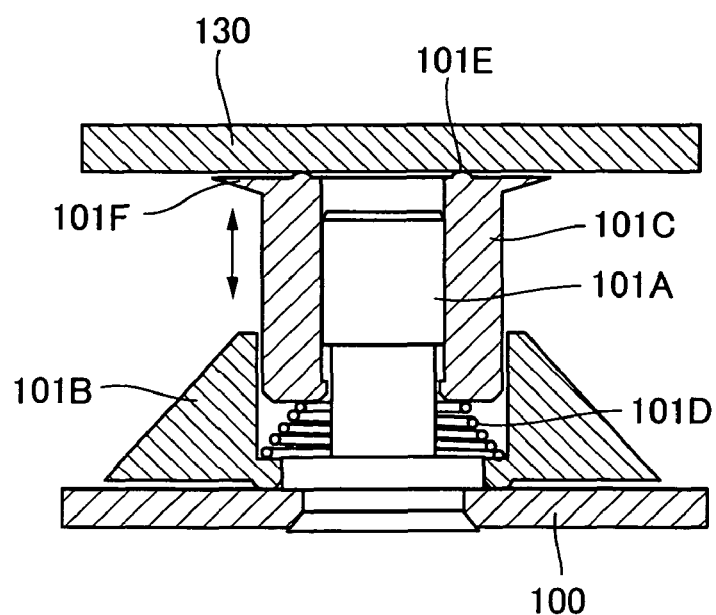
FIG. 18 is a enlarged sectional view of an essential portion showing a guide of a discharge lever of another embodiment.

FIG. 18 is an enlarged sectional view of an essential portion showing a guide of a discharge lever of another embodiment.

Structures having the same functions as those of the above embodiment are designated with the same symbols, and explanation thereof will be omitted.

In the embodiment shown in FIG. 18, an inclined portion 101F is provided on an end of the movable portion 101C on the side of the lid 130. An outer diameter of the inclined portion 101F on the side of the lid 130 is set greater than an outer diameter thereof on the side of the lever 100, and an outer peripheral surface of the inclined portion 101F is inclined. If the inclined portion 101F is provided as in this embodiment, a disk can abut at a predetermined position of the movable portion 101C, it is possible to prevent the disk from inclining.

The guide 101 of the discharge lever 100 has been explained in this embodiment also. The second disk guide 81 of the pull-in lever 80, the guide 112 of the restriction lever 110 and the guide 182 of the guide lever 180 may have the same structure.

According to the present invention, even when a disk which has a tapered outer peripheral end surface is used, it is possible to reliably operate a lever.

INDUSTRIAL APPLICABILITY

The disk apparatus of the embodiment is used in as a disk apparatus which is incorporated in a personal computer having display means, input means and processing means, or which is added to such a personal computer at a later stage, and is especially effective as a notebook personal computer in which display means, input means, processing means and the like are integrally provided.

The invention claimed is:

1. A disk apparatus comprising a chassis outer sheath having a base body and a lid, in which a front surface of said chassis outer sheath is formed with a disk inserting opening into which a disk is directly inserted, a lever which is operated when said disk is inserted or discharged is provided in said chassis outer sheath, said lever is provided at its movable side end with a guide, and said disk is guided by said guide, wherein said guide comprises a stationary portion fixed to said lever, a movable portion which is displaced with respect to said stationary portion, and an elastic body which biases said movable portion in a direction away from said stationary portion.

2. The disk apparatus according to claim 1, wherein said movable portion abuts against an inner side surface of said lid by said elastic body.

3. The disk apparatus according to claim 2, wherein a rib is provided on an end surface of said movable portion on the side of said lid.

4. The disk apparatus according to claim 3, wherein said rib is of a ring-like shape.

5. The disk apparatus according to claim 1, wherein an outer diameter of said stationary portion on the side of said lever is set greater than an outer diameter of said stationary portion on the side of said movable portion, and an outer peripheral surface of said stationary portion is inclined.

6. The disk apparatus according to claim 1, wherein an outer diameter of said movable portion is set smaller than an outer diameter of said stationary portion.

7. The disk apparatus according to claim 1, wherein an outer diameter of said movable portion on the side of said lid is set greater than an outer diameter of said movable portion on the side of said lever, and an outer peripheral surface of said movable portion on the side of said lid is inclined.

8. The disk apparatus according to claim 1, wherein a conical coil spring is used as said elastic body, an outer diameter of said conical coil spring on the side of said lever is set greater than an outer diameter of said conical coil spring on the side of said movable portion.

9. The disk apparatus according to claim 1, wherein a stationary side end which serves as a turning fulcrum of said lever is disposed on an outer periphery on the side of a side surface or a rear surface of said base body, and said movable side end moves on an inner periphery of said base body.

10. The disk apparatus according to claim 1, wherein an inner side surface of said lid is coated with fluorine in which urethane resin beads are mixed.

11. A disk apparatus in which a lever is operated when a disk is inserted or discharged, the lever is provided at its movable side end with a guide, and said disk is guided by said guide, wherein said guide comprises a stationary portion fixed to said lever, a movable portion which is displaced with respect to said stationary portion, and an elastic body which biases said movable portion in a direction away from said stationary portion, a stationary side end, which serves as a turning fulcrum of said lever, is disposed on an outer periphery on the side of a side surface of a base body or a rear surface of said base body, said movable side end moves on an inner periphery of said base body, and said movable portion abuts against an inner side surface of a lid by said elastic body.

12. The disk apparatus according to claim 11, wherein a ring-like rib is provided on an end surface of said movable portion on the side of said lid.

13. The disk apparatus according to claim 11, wherein an inner side surface of said lid is coated with fluorine in which urethane resin beads are mixed.

* * * * *